United States Patent [19]

Cottrell et al.

[11] 4,363,669

[45] Dec. 14, 1982

[54] DISPERSIBLE XANTHAN GUM BLENDS

[75] Inventors: Ian W. Cottrell, Solana Beach; Paul A. Sandford, Del Mar; John K. Baird, San Diego, all of Calif.

[73] Assignee: Merck & Co., Inc., Rahway, N.J.

[21] Appl. No.: 100,315

[22] Filed: Dec. 5, 1979

[51] Int. Cl.³ ............................................. C08L 5/00
[52] U.S. Cl. ................................... 106/205; 106/207; 106/208; 106/316; 536/114
[58] Field of Search .............................. 106/205–208, 106/316; 536/114

[56] References Cited

U.S. PATENT DOCUMENTS

| | | | |
|---|---|---|---|
| 3,748,201 | 7/1973 | Jordan | 149/109 |
| 3,765,918 | 10/1973 | Jordan | 106/205 |
| 3,855,149 | 12/1974 | Bielskis | 106/208 |
| 4,041,234 | 8/1977 | Maske | 536/114 |
| 4,145,454 | 3/1979 | Dea et al. | 426/565 |
| 4,246,037 | 1/1981 | Cottrell | 106/208 |

FOREIGN PATENT DOCUMENTS 1547030  6/1979  United Kingdom .

*Primary Examiner*—Allan Lieberman
*Attorney, Agent, or Firm*—Gabriel Lopez; Hesna J. Pfeiffer

[57] ABSTRACT

Glyoxal treated xanthan gum is dry blended with non-dispersible plant gums. These blends exhibit excellent dispersibility in water.

12 Claims, No Drawings

DISPERSIBLE XANTHAN GUM BLENDS

CROSS-REFERENCE

U.S. application, Ser. No. 959,120 filed Nov. 9, 1978, now abandoned, is incorporated herein by reference for its teaching of how to make CWSTG.

BACKGROUND OF THE INVENTION

There are many high molecular weight compounds, generally referred to as polysaccharides, heteropolysaccharides, gum, etc., which are extremely valuable for their rheological and other properties. Many of these have been extracted from plants for centuries and are used in un-derivatized form, others are produced by fermentation, others are chemically or otherwise treated so as to alter certain properties and make them more useful in particular applications. A difficulty with many of these compounds is that the more soluble they are in water, the more non-dispersible they are, thus requiring long and vigorous agitation in order to prepare lump-free, homogeneous sols. Many techniques have been used to prepare more-dispersible forms of useful gums while retaining their solubility. One example of such a technique is the glyoxal treatment of gum.

SUMMARY OF THE INVENTION

It has now been found that a glyoxal treated xanthan gum when dry blended with the plant gums guar, tara, cold-water soluble tamarind gum, or cold-water soluble locust bean gum produces blends which readily disperse in water while remaining soluble.

DETAILED DESCRIPTION

By glyoxal treated xanthan gum is meant a gum such as is taught in U.S. Pat. No. 4,041,234 or U.K. Pat. No. 1,547,030.

By tara gum is meant the gum extracted from the seed of the leguminous plant *Caesalpinia spinosa.* Tara gum is a galactomannan. An ice-cream stabilizer mixture comprising tara gum and xanthan gum is taught in U.S. Pat. No. 4,145,454.

By cold-water soluble locust bean gum is meant the cold-water soluble form of the gum extracted from the locust bean or carob tree, *Ceratonia siligua,* family Leguminosae, subfamily Caesalpiniaceae. A process for preparing this product is described in U.S. Pat. No. 3,855,149.

By guar gum is meant the gum derived from the seed of the guar plant, as by known purification processes, but not chemical derivatives of guar gum such as hydroxyproply guar. Such chemical derivatives do not form dispersible blends with glyoxal treated xanthan gum.

Guar gum (e.g., Supercol ®, Henkel Corp., Minneapolis, Minn.) is a commercially available product which is essentially the milled endosperm of the plant *Cyanaposis tetragonolobus,* family Leguminosae. Guar gum is used extensively as an additive in paper manufacturing as an aid in fiberfiber bonding. Guar gum is also used as a flocculating agent in the mining industry since it flocculates clays, carbonates, hydroxides and silica. U.S. Pat. No. 3,765,918 describes blends of pre-treated xanthan gum and guar gum which exhibit synergistically high viscosities in aqueous sols. Pre-treatment comprises heating the xanthan gum in the dry state at temperatures above 47° C. A problem with this blend, as well as with the individual gums, is dispersibility.

A dry-blended composition of xanthan gum and hydroxyalkyl ether of guar gum is taught in U.S. Pat. No. 3,748,201.

Tamarind kernel powder is a commercially available product made by husking and milling the seed kernels of the tree *Tamarindus indica Linn.*

By cold-water soluble tamarind gum (CWSTG) is meant a form of tamarind kernel powder which is soluble in cold water. CWSTG is prepared by mixing crude tamarind kernel powder in water at a concentration of 0.1 to 75.0% (preferably 20–50%), heating the solution to a temperature of 35°–130° C. (preferably 70°–100° C.) until a paste is formed, then drying and milling the resulting product.

CWSTG is made by mixing TKP in water at concentrations of 0.1 to 75%, heating this mix to a temperature of 35°–130° C., and then drying (and optionally milling) the resulting CWSTG. The heating and drying steps can be combined, as in the drum drying process. The milling step is preferred so as to produce minute particles which readily hydrolyze.

TKP subjected to this process exhibits cold-water solubility. As indicated, this process does not require the addition of bleaching agents, or any precipitation and/or filtration steps to yield CWSTG. The process conserves time of preparation, reduces reagent costs, and gives yields of approximately 100%. The constraints inherent in said process are governed by temperature, time, and pressure relationships; i.e., at lower temperatures, longer periods of time are required to develop full solubility.

CWSTG can be defined in terms of the viscosity of a solution prepared with cold water (i.e., 5°–35° C.). A CWSTG aqueous solution prepared by adding CWSTG powder to cold water and mixing under moderate shear (e.g., Lightnin Mixer at 800–1,000 rpm) for one hour develops a viscosity of greater than 10 cP (Brookfield LVF viscometer, spindle 1, 60 rpm) at a 1% concentration and greater than 1,000 cP (Brookfield LVF viscometer, spindle 3, 60 rpm) at 10% concentration.

Heating of the TKP/water mix can be accomplished by various methods, including, but not limited to, infrared irradiation, conventional steam heating, drum drying, and microwave heating. The temperature range necessary to achieve cold-water solubility is from 35° C. to just below degradation temperature of TKP; preferably 35°–130° C. TKP held at lower temperatures requires a longer time for viscosity to develop and does not develop the same viscosity as TKP held at higher temperatures. The optimum temperature range is 70°–100° C. at atmospheric pressure.

It is preferred that the TKP concentration range from 4% to 60%. A still more preferred range is 20% to 50%.

The blends of glyoxal treated xanthan gum and the plant gums of this invention are useful over an extremely broad range of gum: gum ratios. Surprisingly, and unexpectedly, the blends remain dispersible even when the ratio of dispersible gum to non-dispersible gum becomes small, down to a ratio of about 25:75 dispersible gum: non-dispersible gum. Below about 25:75 the blend is non-dispersible, as that term is defined below.

The blends of this invention are composed of glyoxal treated xanthan gum and the plant gums guar, tara, cold-water soluble tamarind gum, or cold-water soluble locust bean gum, in the ratio (wt./wt.) xanthan gum:-plant gum ranging from about 50:50 to about 25:75. The ratio 25:75 is especially preferred.

The dispersibility of the blends is excellent over a broad range of particle sizes. Extremely small xanthan gum size adversely affects dispersibility, however. Blends wherein the glyoxal-treated xanthan gum fraction is composed of material which passes completely through a 325 mesh screen exhibit poor dispersibility.

The blends are useful in any of the applications wherein the plant gums are useful. These applications include: flocculating or settling agents to concentrate ores or in water treatment facilities, filter aids, thickeners in food, binders of free water in sauces or ice cream, thickeners for cosmetics or pharmaceuticals, wet end additives in paper processing, thickener and gelling agents for slurry explosives, binders for fragmented tobacco fines, warp sizing of textile fibers, as well as numerous other uses which will be apparent to those skilled in the use of these plant gums.

The blends of this invention have utility for: thickening, suspending, emulsifying, stabilizing, lubricating, film-forming, and binding. In particular, they have uses in the following applications or products: adhesives, wall-joint cements, water-retentive grouts and mortars, spackling compounds, can sealing, boiler compounds, latex creaming, welding-rod fluxes, brazing pastes, ceramic glazes and extrusions, cleaners and polishes, toys, emulsions (latex, asphalt, silicone), silver recovery, seed coatings, spray control for pesticides, emulsifiable concentrated and flowable pesticides, tobacco binders, water-based inks, lithographic fountain solutions, leather finishes, hydromulching and hydroseeding, textile printing and finishing, wet-end paper additives, wet-end paper retention and formation aid, anti-stick compounds, mold-release agents, liquid resins, slurry and packaged explosives, petroleum and water-well drilling muds, petroleum workover and completion fluids, petroleum stimulation fluids, cosmetics, pharmaceutical suspensions and emulsions.

Also these blends have utility in food systems such as jellies and other high sugar systems, beverages including citric acid based drinks, dairy products including ice cream and yogurt, dressings, dry mixes, icings, and glazes, syrups, farinaceous foods, canned and retorted foods, and bakery fillings.

The following is an example of one representative blend of this invention. The blend is 25:75 xanthan:guar and is useful as a thickener for printing 100% nylon carpet.

Formula for 1 Liter of Print Paste 15.0 g Thickener blend
6.5 g Telon Yellow FGL
1.6 g Telon Red FL
15.8 g Telon Blue 2 GL
0.2 g Tergitol 15-S-9
0.1 g Foamgard NS-100
5.0 g EDTA (Na$_4$)
25.0 g Formic acid to 1 liter with H$_2$O The above formula is printed on 100% nylon, steamed, washed, and dried. The resulting print has better fine-line control than guar gum of equal viscosity.

The blending of the gums of this invention can be accomplished by any process which assures the intimate intermingling of the powders.

To test for dispersibility, the following procedure is used. This procedure measures viscosity, dispersibility, and hydration delay time. A blend is non-dispersible if it rates "poor" in this test.

Test Method 1

Dispersibility

1. Add 1.5 gm sample to the side of the vortex in 150 ml synthetic tap water (deionized water containing 0.1% NaCl and 0.01% of CaCl$_2$) in a 250 ml beaker that is being stirred at 500 rpm with a 2-inch magnetic teflon coated stirring bar.
2. After exactly one minute of stirring, check (visually) for lumps. If there are no lumps, rate dispersibility as excellent.
3. If there are lumps, continue to stir another minute (2 minutes total), and re-check for lumps. If there are no lumps, rate dispersibility as good; if there are lumps present, then rate dispersibility as poor.
4. Continue to stir until loss of vortex results. The length of time until 'loss of vortex' shall be recorded and called Hydration Delay Time.
5. Record pH.
6. Using the above solution (or a fresh sample), determine viscosity by adding 1 ml of 0.15 N NaOH and stirring with a Lightnin' mixer at 800 rpm for 2 hours.
7. Record viscosity and pH.

Hydration Delay Time (H.D.) refers to the time taken to reach a certain viscosity. The viscosity is manifested in the loss of the vortex from the solution and H.D. is measured by determining the time taken.

Hydration time or rate of viscosity production is an important secondary parameter of a dispersible product in defining the functionality and utility of the product, e.g., a substantial H.D. allows addition of several lots of a dispersible product to a solution (and possible other components) prior to the development of viscosity allowing improved dispersion of all components and improved homogeneity of the final solution without the need for "heavy" mixing equipment. On the other hand, too long a H.D. would increase the time to prepare a solution of maximal and constant viscosity.

The H.D. of the blends of this invention can be altered and controlled by adjustments to the pH, the ionic strength of, and the amount of shear applied to the solution.

The second pH value (step 7) is obtained in order to ensure that the final solution is not so alkaline as to affect viscosity. A final pH of 7.0–9.0 is desirable. In all the examples, the final pH is <pH 9 and so this second pH value is not shown. The pH shown in the examples is the pH of step 5. It is this pH which in part determines the H.D. of the blends.

In general, for glyoxal-treated gums, the lower the pH, the longer the H.D. However, the relationship is less simple for these blends as the H.D. for the blends is also affected by the plant gum.

The invention is further described in the following examples, which are intended to be illustrative and not limiting.

EXAMPLE 1

Preparation of Cold-Water Soluble Tamarind Gum (CWSTG)

Tamarind kernel powder is dispersed in water to a concentration of 20%, heated to 95° C. for 10 minutes, then dried and milled. The resulting product is dissolved in water at 20° C. and develops a viscosity of 35 cP at 1% concentration, measured at room temperature on a Brookfield LVF viscometer, spindle 1, 60 rpm.

EXAMPLE 2

Preparation of Cold-Water Soluble Tamarind Gum (CWSTG)

Tamarind kernel powder is dispersed in water at ambient temperature at a concentration of 40%. The resulting paste is drum dried with internal steam pressure at 40 psi, and then milled. The resulting product readily dissolves in ambient-temperature water and imparts a viscosity of 30 cP at 1% concentration, measured on a Brookfield LVF viscometer, spindle 1, 60 rpm at room temperature.

For the following examples, CWSTG is prepared as in Example 2 except that instead of drum drying, the CWSTG is dried on a continuous belt drier.

EXAMPLE 3

Comparison of Blends with Guar or CWSTG vs. Blends with Other Polysaccharides Blends of glyoxal-treated xanthan gum (Kelzan S-Kelco Div. of Merck & Co., Inc.) and various polysaccharides are prepared by dry blending and subjected to the dispersibility test of TM 1. The following data are obtained which show the surprising and unexpected result that relatively small amounts of the dispersible glyoxal-treated xanthan gum form dispersible blends when dry mixed with the plant gums of this invention but not with other non-dispersible gums. Viscosity is determined at room temperature on a Brookfield LVF viscometer at 60 rpm using the appropriate spindle.

| Gum | Disp. | Hyd. Delay (min) | pH | 1% Visc. (cP) |
|---|---|---|---|---|
| Kelzan S (control) | Exc. | 19 | 5.1 | 1330 |
| KznS:HEC[1] 250MX(1:1) | Poor | 4 | 5.6 | 1000 |
| KznS:HEC 250MX(1:3) | Poor | 2 | 5.9 | 800 |
| KznS:Methylcellulose[2] 4AM(1:3) | Poor | 6 | 6.5 | 570 |
| KznS:HP Methylcellulose[2] K15M(1:3) | Poor | — | — | — |
| KznS:xanthan gum Keltrol[3] (80:20) | Poor | — | 5.6 | 1350 |
| KznS:xanthan gum Keltrol(50:50) | Poor | — | 6.1 | 1280 |
| KznS:HP Guar[4] HP11(1:3) | Poor | 1.3 | 6.6 | 2220 |
| KznS:CMC[1] 7HF(1:1) | Poor | 25 | 6.4 | 800 |
| KznS:CMC 7HF(1:3) | Poor | 4 | 6.6 | 540 |
| KznS:CWSTG (1:3) | Exc. | 65.5 | 6.0 | 280 |
| KznS:Guar[5] Fine mesh PDL 639(1:3) | Exc. | 5 | | 2400 |

[1]Hercules, Inc., Wilmington, Del.
[2]Dow Chemical Co., Midland, Mich.
[3]Kelco Div. of Merck & Co., Inc., San Diego, California
[4]Stein Hall & Co., Inc., Div. of Celanese Corp., Louisville, Ky.
[5]Henkel Corp., Palo Alto, Calif.

EXAMPLE 4

Comparisons of TKP vs CWSTG

A 3% dispersion of TKP is made up by dispersing TKP in water at room temperature. A solution of CWSTG as prepared in Example 1 is also made up as a 3% solution at room temperature. The viscosities of the dispersion and the solution are measured after 15 minutes of mixing at 1200 rpm on a Lightnin Mixer. The viscosity of the TKP is less than 2 cP as measured on a Brookfield LVF viscometer, spindle 1, 60 rpm, compared with the viscosity of the CWSTG which is 400 cP as measured on the Brookfield LVF viscometer, spindle 3, 60 rpm.

The respective viscosities are remeasured after 4 hours of mixing. The TKP imparts a viscosity of 10 cP whereas the CWSTG imparts a viscosity of 1,100 cP. These viscosities remain unchanged after 24 and 48 hours.

EXAMPLE 5

TKP is processed according to the purification process detailed in U.S. 3,399,189 and compared to CWSTG as prepared by Example 2. Compositional analysis shows the following differences between the two gums:

| | % Protein | % Uronic Acid | % Molar Ratios NEUTRAL SUGARS | | | | |
|---|---|---|---|---|---|---|---|
| | | | Arabinose | Xylose | Mannose | Glucose | Galactose |
| CWSTG | 15.0 | 7.5 | 7.0 | 31.0 | trace | 48.0 | 14.0 |
| Processed TKP | 7.0 | 9.0 | 5.0 | 36.0 | — | 45.0 | 14.0 |

What is claimed is:

1. A dispersible, dry blend of glyoxal-treated xanthan gum and a non-dispersible plant gum selected from the group consisting of guar gum, tara gum, cold-water soluble tamarind gum, and cold-water soluble locust bean gum wherein the xanthan to plant gum weight:-weight ratio ranges from about 50:50 to about 25:75.
2. A blend of claim 1 wherein the ratio is about 25:75.
3. A blend of claim 1 wherein the plant gum is guar gum.
4. A blend of claim 1 wherein the plant gum is tara gum.
5. A blend of claim 1 wherein the plant gum is cold-water soluble tamarind gum.
6. A blend of claim 1 wherein the plant gum is cold-water soluble locust bean gum.

7. A blend of claims 3, 4, 5, or 6 wherein the ratio is about 25:75.

8. A process for preparing a dispersible blend which comprises blending glyoxal treated xanthan gum with a non-dispersible plant gum selected from the group consisting of guar gum, tara gum, cold-water soluble tamarind gum, and cold-water locust bean gum wherein the weight:weight ratio of xanthan to plant gum ranges from about 50:50 to about 25:75.

9. The process of claim 8 wherein the ratio is about 25:75.

10. The process of claim 8 wherein the plant gum is guar gum.

11. The process of claim 8 wherein the plant gum is cold-water soluble tamarind gum.

12. The process of claim 10 or claim 11 wherein the ratio is about 25:75.

* * * * *